UNITED STATES PATENT OFFICE.

CARLETON ELLIS, OF MONTCLAIR, NEW JERSEY.

PREPARATION OF HYDROGENATING CATALYSTS.

1,369,013. Specification of Letters Patent. Patented Feb. 22, 1921.

No Drawing. Application filed April 5, 1916. Serial No. 89,093.

*To all whom it may concern:*

Be it known that I, CARLETON ELLIS, a citizen of the United States, residing at Montclair, in the county of Essex and State of New Jersey, have invented certain new and useful Improvements in the Preparation of Hydrogenating Catalysts, of which the following is a specification.

This invention relates to the art of making catalyzers adapted for hydrogenating fatty oils and other unsaturated bodies and for similar purposes and relates especially to a process of preparing an easily suspendable finely-divided catalyzer, preferably consisting of or containing nickel material, of predetermined degree of subdivision in adequate distribution in the liquid vehicle or substance to be hydrogenated, particularly by the use of non-catalytic salts or compounds of nickel or other metal employed, all as more fully hereinafter described and as claimed.

The present application is a continuation of matter from my prior application 656,100, filed October 23, 1911 (now Patent 1,026,156, dated May 14, 1912), the subject matter of the present case being continued in my copending application 686,988, filed March 22, 1912, now Patent 1,217,118.

My present invention contemplates the production of a metal catalyst from an oil-soluble catalyzer raw material, such as a compound of a catalytic metal (for example nickel) united to a very weak organic acid such as oleic acid. While nickel oleate itself has apparently no catalytic properties as a hydrogenating catalyst (and even seems to operate as a deterrent of hydrogenation), the free metal produced therefrom is highly active. A metallo-organic compound soluble in oil, which consists of a metal united to a very weak orgnic acid, such as oleic acid, is suitable for the production of the catalyst, especially as by regulating the temperature properly such a metallo-organic compound may be decomposed in a predetermined manner, setting free the catalyst in some instances as an "oil-colloid" in a state of almost infinite subdivision, perhaps molecular; and colloidally suspended or existing in a state of quasi solution wonderfully conducive to accelerated hydrogen absorption by the fatty material.

When an oil colloid is to be produced by heating an oil-soluble metallo-organic compound to the requisite temperature, the selection of the metallo-organic compound should be made with particular reference to the hydrogen absorptive properties, thermally considered, of the oil to be treated.

While I have particularly mentioned nickel, other catalysts may be so produced, for example copper, iron palladium, platinum, cobalt, chromium, manganese, titanium, molybdenum, vanadium and the like.

The said oil-soluble material may be dissolved in an unsaturated oily body for example in oleic acid and the mixture passed through a tube of great length, while in a heated condition, with agitation if desired, which tube may be lined with a catalytic metal such as one of those above identified, and a current of water-gas or other reducing gas may be passed in the opposite direction, whereby the entering oil meets water-gas very poor in hydrogen, and the partially converted oil meets gas rich in hydrogen. In such a mode of procedure, the oil-soluble compound of the catalytic metal is first of all reduced to metal, in an extremely fine state of subdivision, referred to as an oil-colloid, and this metal acts as a catalyst to effect the hydrogenation of the oily material.

I am aware that it has heretofore been proposed to employ nickel oxid as such, as a catalyzer in the process of hydrogenation of fatty oils. In such operation, nickel oxid is suspended in the oil or mixed therewith, and hydrogen is contacted with the mixture, at temperatures suitable for effecting the hydrogenation of the oil. In U. S. Patent No. 1,026,339, involving such a process, it is stated that under some unusual circumstances, a portion of the catalyzer (nickel oxid) might be reduced, but no indication is given in such patent that such reduced portion is itself of any value as a catalyst for the hydrogenation of oils. In accordance with the process of the present invention in its preferred aspects, however, I am not trying to employ such nickel oxid as a catalyzer, but the object of the invention is to produce a catalzer of which the essential or basic active constituent is metallic nickel. This result is best effected by the substantially complete reduction to the metallic state, of the non-catalytic nickel compound in oil, whereby the preferred product, containing essentially metallic nickel mixed with an oil, possesses marked catalytic activity.

What I claim is:—

1. The method of preparing a metal catalyzer, which consists in subjecting a heated mixture of oil and a substantially non-catalytic reducible nickel compound to the action of a gaseous reducing agent.

2. The herein described process comprising mixing a readily reducible salt of a metal catalyst with a fatty acid, into a suspensory medium, and heating and adding a reducing agent to produce reduced finely divided metal in suspension in such medium.

3. The herein described process, which consists in incorporating a non-catalytic nickel salt of a fatty acid with an oil, and reducing such nickel salt to the metallic state.

4. The herein described process which consists in incorporating a fatty acid salt of a hydrogenating metal catalyst in an oil vehicle, and then reducing such salt, by heat and a reducing agent.

5. In the preparation of catalysts, the step of treating a heated flowing current of oil vehicle containing a readily reducible nickel compound with a counter current of gas having a reducing action, whereby such nickel compound is reduced and free metal formed.

6. The process of making a catalyzer consisting in incorporating a reducible salt of a non-noble hydrogenating metal catalyst in an oil vehicle and reducing the said salt by heat and a reducing agent, in said vehicle.

7. The herein described process which consists in incorporating a reducible non-catalytic nickel compound in a suspensory vehicle, and then reducing the said nickel compound while in such vehicle to produce a mixture of catalyst therewith.

8. The process of making a catalyzer consisting in producing an intimate mixture of a reducible salt of a non-noble metal catalyst and an organic vehicle and reducing such compound in such vehicle.

9. The herein described process of making a catalyst which comprises incorporating a reducible non-catalytic nickel compound in a suspensory vehicle, and then reducing the said nickel compound substantially completely to the metallic state while in such vehicle, to produce a mixture of metallic nickel catalyst with such vehicle.

CARLETON ELLIS.